United States Patent
Chadwell

(10) Patent No.: US 9,715,431 B2
(45) Date of Patent: Jul. 25, 2017

(54) REBUILDING DRIVE DATA

(71) Applicant: Hewlett Packard Enterprise Development LP, Houston, TX (US)

(72) Inventor: Sharon Jillian Chadwell, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/905,045

(22) PCT Filed: Jul. 15, 2013

(86) PCT No.: PCT/US2013/050547
§ 371 (c)(1),
(2) Date: Jan. 14, 2016

(87) PCT Pub. No.: WO2015/009280
PCT Pub. Date: Jan. 22, 2015

(65) Prior Publication Data
US 2016/0154718 A1    Jun. 2, 2016

(51) Int. Cl.
*G06F 11/00* (2006.01)
*G06F 11/10* (2006.01)
(Continued)

(52) U.S. Cl.
CPC ...... *G06F 11/1092* (2013.01); *G06F 11/2094* (2013.01); *G11B 20/18* (2013.01); *G11B 20/1883* (2013.01)

(58) Field of Classification Search
CPC ............... G06F 11/008; G06F 11/1092; G06F 11/2028; G06F 11/2094
(Continued)

(56) References Cited

U.S. PATENT DOCUMENTS 5,727,144 A * 3/1998 Brady .................. G06F 11/004
714/57
7,451,346 B2 * 11/2008 Katsuragi ........... G06F 11/0727
711/114

(Continued)

FOREIGN PATENT DOCUMENTS

WO    WO-2006019643       2/2006
WO    WO-2012029095 A1    3/2012

OTHER PUBLICATIONS

ISR/WO, PCT/US2013/050547, HP reference 83273371, Apr. 18, 2014, 10 pps.

(Continued)

*Primary Examiner* — Joseph Kudirka
(74) *Attorney, Agent, or Firm* — International IP Law Group, PLLC

(57) ABSTRACT

The present disclosure provides a system that includes an array of disk drives and a controller communicatively coupled to the array of disk drives. The controller is to identify, within the array of disk drives, a predictive failed disk. The controller also rebuilds data of the predictive failed disk on a spare drive in a regeneration mode and determines a regeneration time baseline. The controller also rebuilds data of the predictive failed disk on the spare drive in a copy mode and determines the copy mode execution time. The controller switches to regeneration mode if the copy mode execution time is greater than the regeneration time baseline.

15 Claims, 4 Drawing Sheets

(51) Int. Cl.
*G11B 20/18* (2006.01)
*G06F 11/20* (2006.01)

(58) Field of Classification Search
USPC .................................................. 714/6.3, 6.32
See application file for complete search history.

(56) References Cited

U.S. PATENT DOCUMENTS

| | | |
|---|---|---|
| 7,590,801 B1 | 9/2009 | Gavarre et al. |
| 8,185,784 B2 | 5/2012 | McCombs et al. |
| 2006/0117216 A1 | 6/2006 | Ikeuchi et al. |
| 2006/0149900 A1 | 7/2006 | Terry et al. |
| 2009/0083584 A1 | 3/2009 | Nadeau et al. |
| 2009/0271657 A1 | 10/2009 | McCombs et al. |
| 2013/0047028 A1 | 2/2013 | Daikokuya et al. |

OTHER PUBLICATIONS

Wu, S. et al., JOR: a Journal-guided Reconstruction Optimization for RAID-structured Storage Systems, (Research Paper), 15th International Conference on Parallel and Distributed Systems, Dec. 8-11, 2009, pp. 609-616, http://ieeexplore.ieee.org/stamp/stamp.jsp?arnumber=5395357.

\* cited by examiner

300

REBUILDING DRIVE DATA

BACKGROUND

A redundant array of independent disks (RAID) is a storage technology that controls multiple disk drives and provides fault tolerance by storing data with redundancy. A failure to access data stored in a disk drive will cause the array controller to fail the disk drive and initiate a rebuild process that regenerates the lost data from the other disk drives in the RAID. During this rebuild process, the RAID is in a degraded state and may not be fault tolerant, depending on the particular RAID configuration used. If another failure occurs, the entire volume of data from the failed disk drive can be lost.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure relates to techniques for rebuilding disk drive data for a RAID disk that is predicted to fail. Predictive Spare Rebuild (PSR) is a process by which an array controller identifies a data disk that is predicted to fail and activates a spare disk for it prior to the actual failure. The host data on the predictive failure disk is recreated on the spare disk by directly copying the data from the predictive failure disk or regenerating the data from the other disks in the array. Upon the completion of the spare rebuild operation, the predictive failure disk is identified as failed so it can be replaced by the customer. By proactively replacing the disk that is predicted to fail, degradation of the RAID array and potential loss of data can be avoided.

One way to implement a predictive spare rebuild is to copy host data from the predictive failure disk and only regenerate data upon encountering uncorrectable read errors. However, in some situations, the predictive failed disk may be in a degraded operational state and may, therefore, process data operation requests slowly. Under these circumstances, the host data can take longer to copy from the predictive failed disk than to regenerate from the existing good data disks, resulting in an inefficient Predictive Spare Rebuilds. Furthermore, during the rebuild, host (Input/Output) I/O will be written to both the spare and predictive failed disk. Therefore, any time lost in the rebuild results in unnecessary write workloads to a disk that is performing with suboptimal conditions. Poor I/O workload performance globally impacts the storage array and has a negative effect on overall system performance.

The present disclosure describes techniques wherein rebuild of the predictive failed disk can be accelerated by implementing a rebuild performance monitoring tool. The performance algorithm optimizes the rebuild time by switching between a copy mode and regeneration mode based on the relative performance of each of the modes. As a result, the predictive spare rebuild can be accomplished faster.

Figure 1:
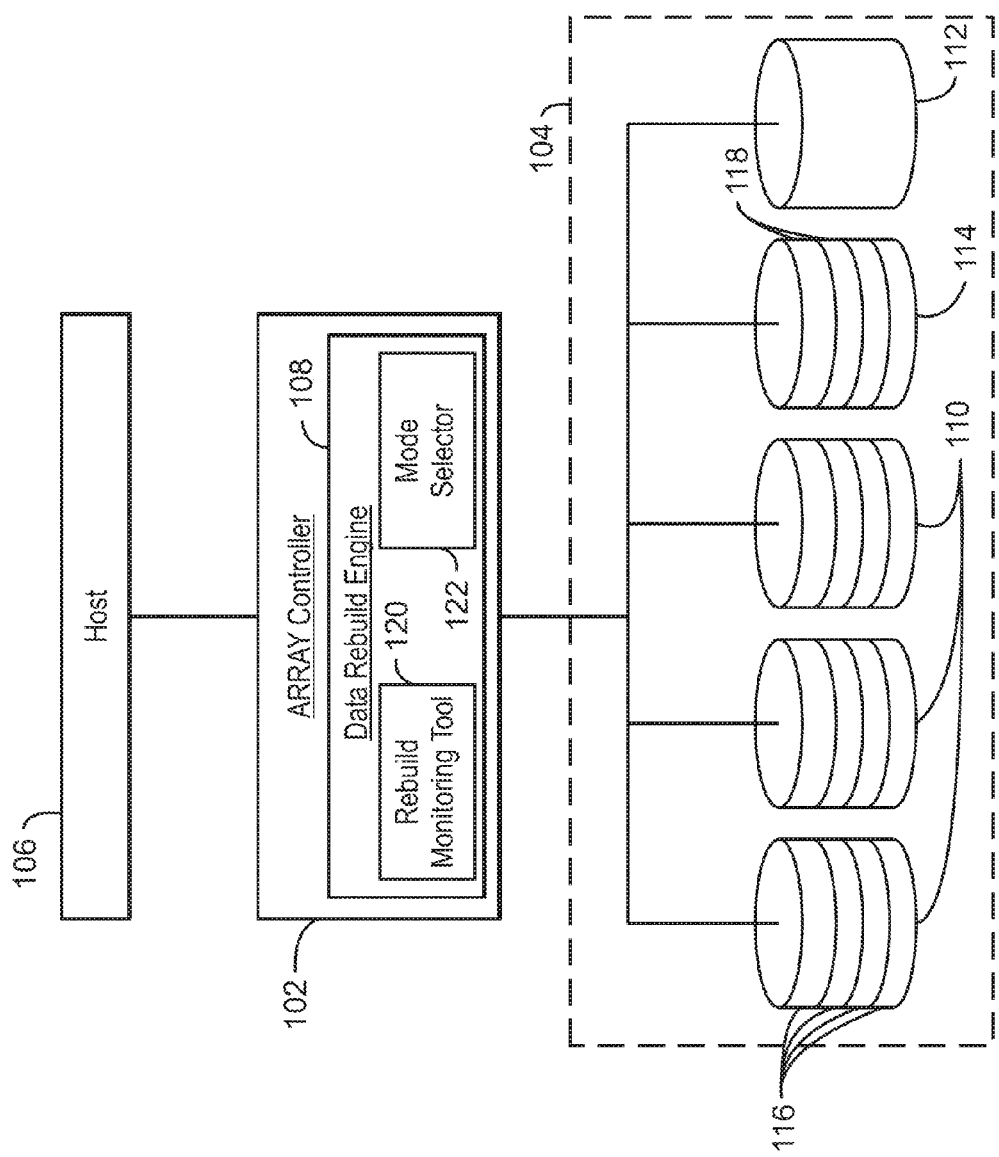
FIG. 1 is a block diagram of a redundant array of independent disks (RAID) system.

FIG. 1 is a block diagram of a redundant array of independent disks (RAID) system. The RAID system 100 can include an array controller 102 configured to operate an array of disk drives 104. The RAID system can also include a host computer 106 that can access the array of disk drives 104 through the array controller 102. Each of the disk drives 110 is configured to store data received from the host 106 on one or more portions 116, or platters. The array controller 102 can include a data rebuild engine 108 configured to rebuild disk drive data if a failure condition is detected. The data rebuild engine 108 can be implemented in hardware or a combination of hardware and programming code. For example, the rebuild engine 108 can include a non-transitory, computer-readable medium for storing instructions, one or more processors for executing the instructions, or a combination thereof.

In some embodiments, the failure condition detected is a predicted failure, wherein the disk drive is still operable but is predicted to fail within the near future based on various indicators of reliability. Various automated monitoring systems may be used to predict the failure of a disk drive. Such monitoring systems may be referred to as Self-Monitoring, Analysis, and Reporting Technology (S.M.A.R.T.). As used herein, the phrase "predictive failure disk," refers to a disk drive that is predicted to fail by a monitoring system such as a S.M.A.R.T. system, for example. The monitoring system may be implemented in the array controller 102. If the monitoring system detects a failure condition, the monitoring system can trigger a predictive spare rebuild, which is a process in which the data on the predictive failure disk is re-created on a spare disk drive.

The RAID level of the disk array 104 may be any suitable RAID level, which may be determined based on the design considerations of a particular implementation, such as the desired redundancy level and performance characteristics. For example, the disk array 104 can be configured as a RAID level 0, 1, 2, 3, 4, 5, or 6. The disk array 104 may include a number of disks drives 110. The disk array 104 can also include a spare drive 112, which can be activated if a failure condition is detected. In some embodiments, the disk array 104 also includes a parity drive 114. The parity drive 114 can contain data or logic that can be used to regenerate data of the predictive failure disk if the original data is corrupted or inaccessible. The data in the parity drive 114 can recreate lost data based on existing data remaining on disk drives 110.

In some embodiments, the parity drive 114 contains multiple portions 118, in which each portion 118 corresponds to its respective disk drive portion 116. In some embodiments, the array of drives 104 may not include a dedicated parity drive 114, but rather parity portions 118 distributed among the disk drives 116. In some embodiments, the array of drives 104 may have more than one parity drive 114. In some embodiments, the array of drives 104 does not include a parity drive 114.

Depending on the RAID configuration, data striping may be used to store host data to the disk drive array 104. In data striping, logically sequential data such as a file is segmented and stored on different disk drives 110 or different portions 116 of a disk drive 110. The data segments, referred to as "stripes," may all be of the same fixed size, which may be specified by the user. During the rebuilding of the data from the predictive failed disk onto the spare drive, the data is recreated on the spare drive in increments referred to as rebuild stripe operations. Each rebuild stripe operation rebuilds the data of a single stripe on the spare drive.

The data rebuild engine can use any suitable technique for rebuilding the data of the predictive failure disk on the spare drive 112. During the rebuilding of the data, the data rebuild engine 108 may switch between a regeneration mode and a copy mode. In the copy mode, the data is copied directly from the predictive failed disk and stored to the spare drive 112. In some embodiments, the array controller 102 uses Small Computer System Interface (SCSI) commands to request the data from the predictive failed disk and store the data to the spare disk 112. In the regeneration mode, the data rebuild engine 108 rebuilds the data using the redundant data on other disk drives 110, including, in some embodiments, the parity drive 114. As used herein, the term "regeneration" or "regeneration mode" refers to any technique for rebuilding the data of the predictive failed disk that does not use the predictive failed disk.

The data rebuild engine 108 can also include a rebuild monitoring tool 120 and a mode selector 122. The rebuild monitoring tool 120 monitors the performance achieved during the regeneration mode and during the copy mode. For example, the rebuild monitoring tool 120 can monitor and record the amount of time it takes to rebuild a portion of the predictive failed drive using data regeneration and the amount of time it takes to rebuild a portion of the predictive failed drive using direct copy. In some embodiments, the relative performance of each mode may be monitored by measuring the execution time of the rebuild stripe operations. The relative performance of the two techniques is used to determine which mode to use in re-creating the data of the predictive failed disk. The mode selector 122 directs the data rebuild engine 108 to operate in either the regeneration mode or copy mode, depending on the relative performance of the two modes as reported by the rebuild monitoring tool 120. For example, if regeneration of the data is being accomplished faster than direct copying, then the mode selector 122 can direct the data rebuild engine 108 to use regeneration mode even though the data being regenerated may still be accessible on the predictive failure disk.

Figure 2:
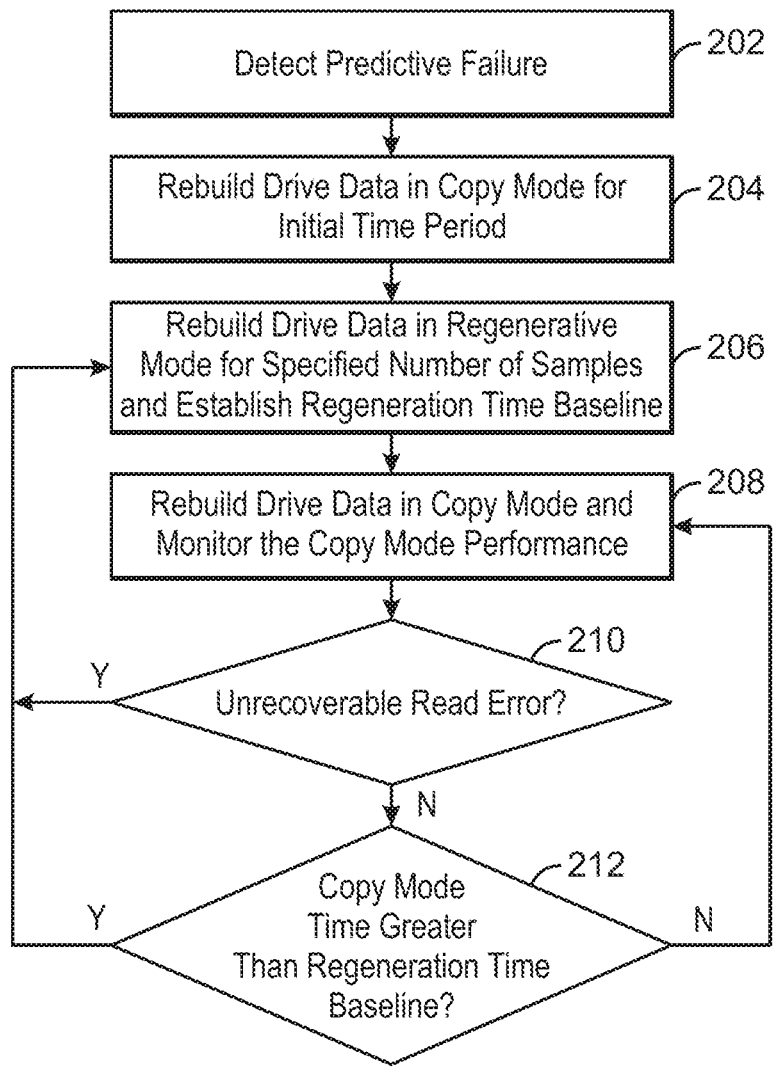
FIG. 2 is a process flow diagram of a method of rebuilding a predictive failed disk drive.

FIG. 2 is a process flow diagram of a method of rebuilding a predictive failed disk drive. The method 200 can be performed, for example, by the data rebuild engine 108 of the array controller 102 shown in FIG. 1.

At block 202, the array controller 102 detects a predictive failure of a disk drive. As described above, the predictive failure may be detected, for example, by a S.M.A.R.T. system that analyzes various metrics of a disk drive to predict failure. The detection of the predictive failure triggers the data rebuild engine 108 to start rebuilding the disk drive data of the predictive failed disk on the spare drive 112. The process flow may then advance to block 204.

At block 204, the data rebuild engine 108 rebuilds the disk drive data in copy mode for an initial time period. During this initial time period, the data rebuild engine 108 does not monitor performance of the copy mode. The initial time period is implemented so that smaller data volume disk drives can finish rebuilding before regenerative mode begins. If the predictive failed disk contains a low enough amount of memory, the data rebuild can finish within the initial time period and the process flow can terminate without advancing to block 206. If an unrecoverable error is encountered during the initial time period, the data corresponding to the unrecoverable error may be regenerated. After the data is regenerated, copy mode can resume. The duration of the initial time period may be any suitable duration. In some embodiments, the initial time period may be approximately five minutes. In some embodiments, this initial time period can be eliminated, in which case block 204 would be skipped.

At block 206, the array controller 102 enters regeneration mode and rebuilds the drive data for a specified number of samples. As used herein, the term "sample" refers to a number of stripes that are rebuilt during each rebuild stripe operation. For example, if there are five stripes per sample, each rebuild stripe operation will rebuild five stripes. The number of stripes per sample is determined by the data rebuild engine at runtime based on characteristics of the RAID volume. The execution time of the samples is used to establish a regeneration time baseline. The regeneration time baseline may be any suitable value that characterizes the execution time of the samples during regeneration mode. For example, the regeneration time baseline may be computed as the average execution time per sample. In some embodiments, the regeneration time baseline may be determined as the total execution time for the specified number of samples. The specified number of samples used to establish the regeneration time baseline may be any suitable number, depending on the design considerations of a particular implementation. For example, the number of samples may be 1, 5, 10, 15, 25, 100, or any other suitable number.

In some embodiments, the regeneration time baseline will be determined based only on clean samples. The term clean here means that there were no errors encountered during the execution of the sample, for example, no Unrecoverable Read Errors (UREs), retries, timeouts, or Additional Sense Code (ASC), or ASC Qualifier (ASCQ) values indicating recovered errors. Accordingly, if an error is encountered, the corresponding sample is excluded from the determination of the regeneration time baseline.

At block 208, array controller 102 switches to copy mode and the data to be rebuilt is copied directly from the predictive failed disk to the spare drive. While in copy mode, the array controller 102 monitors the copy mode performance. To monitor the copy mode performance, the array controller 102 establishes a copy mode execution time that can be compared to the regeneration time baseline. For example, the array controller 102 can determine the execution time of the same number samples as was used to determine the regeneration time baseline. For the purpose of the monitoring done at block 208, the samples do not need to be clean. Any errors occurring during copy mode will degrade the performance of rebuild, which will be seen as a longer latency of the rebuild stripe operation. The rebuild can continue in copy mode until an unrecoverable error is encountered or until the array controller 102 determines that regeneration mode is likely to provide better performance compared to copy mode. The determination that regeneration mode may provide better performance can be accomplished by comparing the regeneration time baseline with the latest copy mode execution time.

At block 210, if an unrecoverable read error is encountered, the process flow returns to block 206 and the rebuild process switches to regeneration mode for the specified number of samples. The specified number of samples is predetermined prior to the encountering the unrecoverable read error and is, therefore, not determined based on any characteristic of the error itself. By returning to block 206, regeneration mode will continue for the specified number of samples rather than returning back to copy mode immediately after the data that caused the error has been regenerated. This may be advantageous because it is probable that there would be additional unrecoverable read errors on subsequent data blocks. Thus, switching to regenerative mode for a specified number of samples after encountering an unrecoverable read error may save time by proactively predicting disk errors. At block 206, a new regeneration time baseline is determined.

At block 212, if a determination is made that the most recent copy mode time is greater than the regeneration time baseline, the process flow advance to block 206. Here again, the rebuild process switches to regeneration mode for the specified number of samples and a new regeneration time baseline is established. If at block 212, the most recent copy mode time is less than the regeneration time baseline, then the process flow advances to block 208 and the rebuild process continues in copy mode.

The process flow of method 200 continues as shown in FIG. 2 until the data of the predictive failed disk is completely rebuilt on the spare drive 112. After the data is rebuilt, the array controller 102 can alert a system administrator that the rebuild is complete and that the predictive failed disk can be removed.

Figure 3:
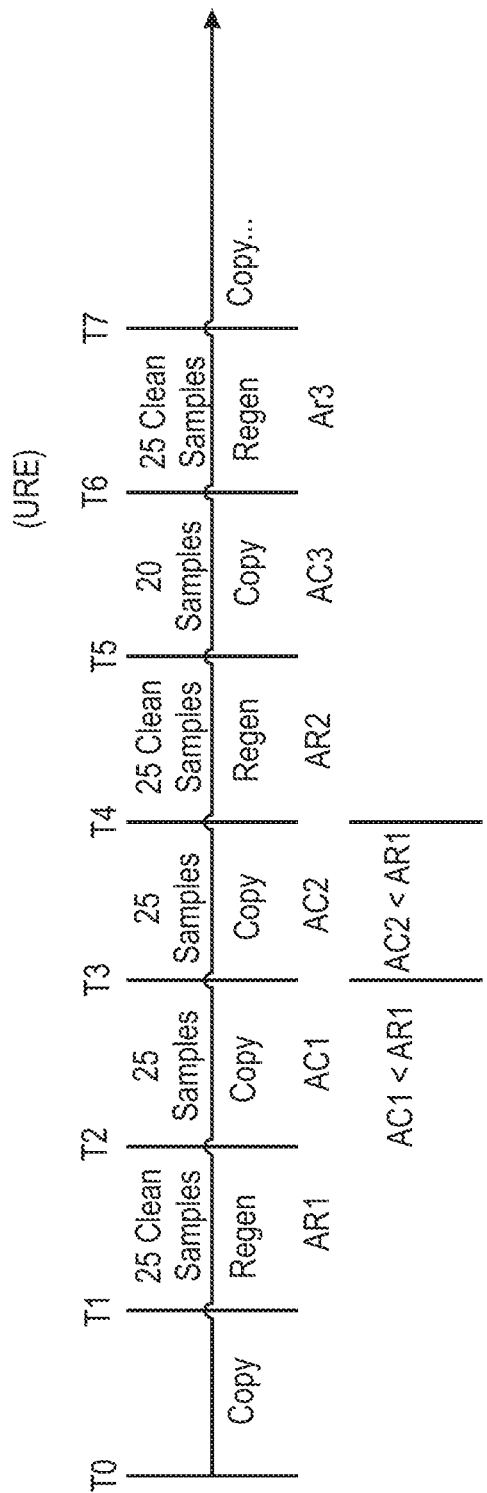
FIG. 3 is a timeline showing an example of specific rebuild process performed according to method 200 of FIG. 2.

FIG. 3 is a timeline showing an example of specific rebuild process performed according to method 200 of FIG. 2. The timeline 300 is divided into arbitrary time increments, $T_0$ to $T_7$. The time increments, $T_0$ to $T_7$, are not intended to indicate equal time increments.

As shown in FIG. 3, the data rebuild process starts at time $T_0$. The rebuild process then begins in copy mode and continues for the initial time period, as described in relation to block 204 of FIG. 2. In this specific example, the initial time period is five minutes.

At time $T_1$, the data rebuild process switches to regeneration mode and a specified number of clean samples are acquired. In this example, the specified number of samples is 25. Based on the 25 clean samples, the regeneration time baseline, AR1, is determined.

At time $T_2$, the data rebuild process switches to copy mode. After successfully copying the specified number of samples, the copy mode execution time, AC1, is determined as discussed above in relation to block 208 of FIG. 2.

At time $T_3$, the copy mode execution time, AC1, is compared to the regeneration time baseline, AR1. In this instance, the copy mode execution time is less than the regeneration time baseline. Accordingly, the rebuild process continues in copy mode. After copying the specified number of samples, a new copy mode execution time, AC2, is determined.

At time $T_4$, the copy mode execution time, AC2, is compared to the regeneration time baseline, AR1. In this instance, the copy mode execution time is greater than the regeneration time baseline. Accordingly, the rebuild process switches to regeneration mode. Regeneration mode continues until 25 new clean samples are acquired, and a new regeneration time baseline, AR2, is determined.

At time $T_5$, the data rebuild process switches to copy mode. At time $t_6$, an unrecoverable read error is encountered and the rebuild process switches to regeneration mode. Regeneration mode continues until 25 new clean samples are acquired, and a new regeneration time baseline, AR3, is determined. At time $T_7$, the rebuild process returns to copy mode. The rebuild process continues in the same manner as described above until the data is rebuilt on the spare drive.

Figure 4:
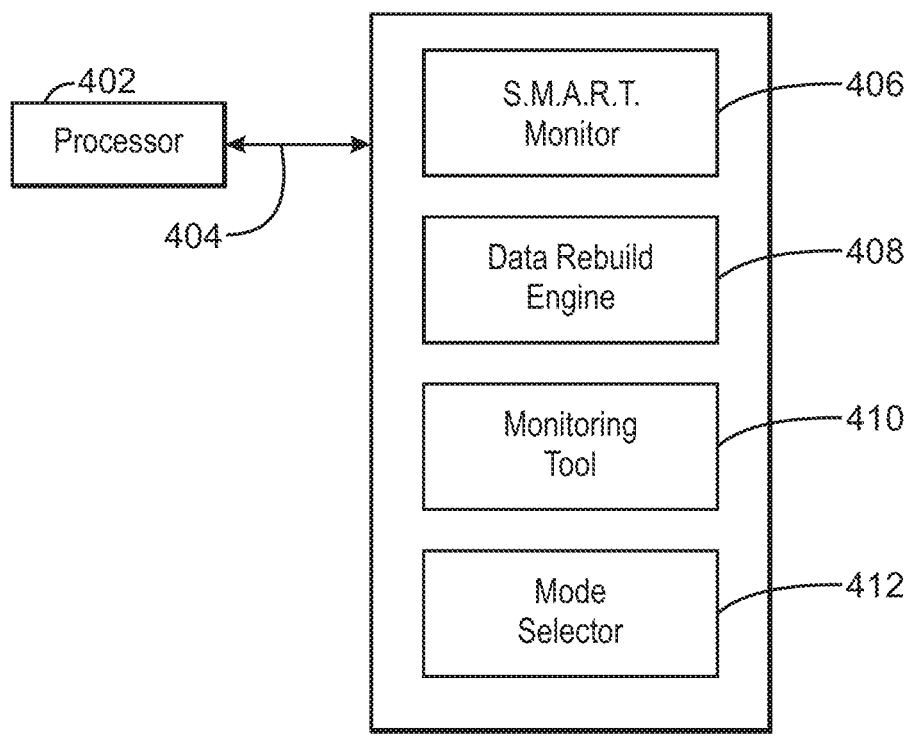
FIG. 4 is a block diagram showing a tangible, non-transitory, computer-readable medium that stores code configured to rebuild a predictive failed disk drive.

FIG. 4 is a block diagram showing a tangible, non-transitory, computer-readable medium that stores code configured to rebuild a predictive failed disk drive. The computer-readable medium is referred to by the reference number 400. The computer-readable medium 400 can include RAM, a hard disk drive, an array of hard disk drives, an optical drive, an array of optical drives, a non-volatile memory, a flash drive, a digital versatile disk (DVD), or a compact disk (CD), among others. The computer-readable medium 400 may be accessed by a processor 402 over a computer bus 404. Furthermore, the computer-readable medium 400 may include code configured to perform the methods described herein. For example, the computer readable medium 400 may include firmware that is executed by an array controller such as the array controller 102 of FIG. 1.

The various software components discussed herein may be stored on the tangible, non-transitory, computer-readable medium 400. A region 406 on the computer-readable medium 400 can include S.M.A.R.T. monitor configured to monitor the disk drives of a disk array and determine whether a disk is exhibiting behavior that indicates that the disk is about to fail. A region 408 can include a data rebuild engine to rebuild the data of the predictive failed disk on a spare drive. The data rebuild engine can operate in copy mode or regeneration mode. A region 410 can include a rebuild monitoring tool to monitor the relative performance of copy mode and regeneration mode. For example, the rebuild monitoring tool can track the execution times of rebuild stripe operations executed in each mode. A region 412 can include a mode selector that determines whether the data rebuild engine uses copy mode or regeneration mode based, at least in part, on which mode is performing better. Although shown as contiguous blocks, the software components can be stored in any order or configuration. For example, if the tangible, non-transitory, computer-readable medium is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system, comprising:
an array of disk drives; and
a controller communicatively coupled to the array of disk drives, the controller to:
identify, within the array of disk drives, a predictive failed disk;
rebuild data of the predictive failed disk on a spare drive in a regeneration mode and determine a regeneration time baseline;
rebuild data of the predictive failed disk on the spare drive in a copy mode and determine a copy mode execution time; and
switch to regeneration mode if the copy mode execution time is greater than the regeneration time baseline.

2. The system of claim 1, wherein the controller is configured to determine the regeneration time baseline using only samples that have not generated an error.

3. The system of claim 1, wherein after the switch to regeneration mode, the controller is configured to regenerate a specified number of samples and determine a new regeneration time baseline.

4. The system of claim 1, wherein upon detecting an unrecoverable error, the controller is configured to switch to regeneration mode and stay in regeneration mode for a predetermined number of samples.

5. The system of claim 1, wherein the controller is configured to rebuild the data of the predictive failed disk in copy mode for an initial time period after the rebuilding begins.

6. A method, comprising:
 monitoring a disk array to identify a predictive failed disk;
 rebuilding data of the predictive failed disk on a spare drive in a regeneration mode and determining a regeneration time baseline;
 rebuilding data of the predictive failed disk on the spare drive in a copy mode and determining a copy mode execution time; and
 switching to regeneration mode if the copy mode execution time is greater than the regeneration time baseline.

7. The method of claim 6, wherein determining the regeneration time baseline comprises determining the regeneration time baseline using only samples that have not generated an error.

8. The method of claim 6, comprising, after switching to regeneration mode, regenerating a specified number of samples and determining a new regeneration time baseline.

9. The method of claim 6, comprising, in response to detecting an unrecoverable error, switching to regeneration mode and staying in regeneration mode for a predetermined number of samples.

10. The method of claim 6, comprising rebuilding the data of the predictive failed disk in copy mode for an initial time period after the rebuilding begins.

11. A tangible, non-transitory, computer-readable medium comprising instructions that direct a processor to:
 identify a predictive failed disk;
 rebuild data of the predictive failed disk on a spare drive in a regeneration mode and determine a regeneration time baseline;
 rebuild data of the predictive failed disk on the spare drive in a copy mode and determine a copy mode execution time; and
 switch to regeneration mode if the copy mode execution time is greater than the regeneration time baseline.

12. The computer-readable medium of claim 11, comprising instructions that direct the processor to determine the regeneration time baseline using only samples that have not generated an error.

13. The computer-readable medium of claim 11, comprising instructions that direct the processor to regenerate a specified number of samples and determine a new regeneration time baseline after switching to regeneration mode.

14. The computer-readable medium of claim 11, comprising instructions that, in response to detecting an unrecoverable error, direct the processor to switch to regeneration mode and stay in regeneration mode for a predetermined number of samples.

15. The computer-readable medium of claim 11, comprising instructions that direct the processor to rebuild the data of the predictive failed disk in copy mode for an initial time period after the rebuilding begins.

* * * * *